(12) United States Patent
Li

(10) Patent No.: US 8,518,252 B1
(45) Date of Patent: Aug. 27, 2013

(54) SYSTEM FOR FIELD INTRAVENOUS FLUID RECONSTRUCTION

(75) Inventor: Lixiong Li, Panama City, FL (US)

(73) Assignee: Applied Research Associates, Inc., Albuquerque, NM (US)

(*) Notice: Subject to any disclaimer, the term of this patent is extended or adjusted under 35 U.S.C. 154(b) by 1141 days.

(21) Appl. No.: 12/119,480

(22) Filed: May 12, 2008

(51) Int. Cl.
| | |
|---|---|
| B01D 61/02 | (2006.01) |
| B01D 61/14 | (2006.01) |
| C02F 1/02 | (2006.01) |
| C02F 1/44 | (2006.01) |

(52) U.S. Cl.
USPC ........ 210/257.2; 210/258; 210/103; 210/104; 210/739; 210/130; 210/134; 210/149; 210/181; 210/195.2; 210/259; 210/416.3; 210/428; 210/900; 422/26

(58) Field of Classification Search
USPC ............................................................ 422/3
See application file for complete search history.

(56) References Cited

U.S. PATENT DOCUMENTS

| | | | |
|---|---|---|---|
| 1,027,831 A | 5/1912 | Fox | |
| 3,249,229 A | 5/1966 | Kasten | |
| 4,072,610 A | 2/1978 | Gow et al. | |
| 4,282,863 A | 8/1981 | Beigler et al. | |
| 4,610,790 A | 9/1986 | Reti et al. | |
| 4,621,679 A * | 11/1986 | Byers et al. | 165/299 |
| 4,730,435 A | 3/1988 | Riddle et al. | |
| 4,881,661 A | 11/1989 | Jones | |
| 5,032,265 A | 7/1991 | Jha et al. | |
| 5,147,532 A | 9/1992 | Leek, Jr. | |
| 5,259,954 A | 11/1993 | Taylor | |
| 5,484,431 A | 1/1996 | Scharf et al. | |
| 5,503,735 A | 4/1996 | Vinas et al. | |
| 5,520,816 A | 5/1996 | Kuepper | |
| 5,562,616 A | 10/1996 | Haber et al. | |
| 5,944,709 A | 8/1999 | Barney et al. | |
| 6,485,649 B1 | 11/2002 | Terava et al. | |
| 6,585,890 B2 | 7/2003 | Li et al. | |
| 6,679,988 B2 | 1/2004 | Gsell | |
| 6,858,179 B2 | 2/2005 | Li et al. | |
| 6,874,299 B2 | 4/2005 | Basque | |
| 7,122,149 B2 | 10/2006 | Li et al. | |
| 7,244,247 B1 | 7/2007 | Falciani et al. | |
| 2004/0109788 A1* | 6/2004 | Li et al. | 422/3 |

FOREIGN PATENT DOCUMENTS

| | | |
|---|---|---|
| EP | 1785151 A | 5/2007 |
| GB | 2002736 A | 2/1979 |

* cited by examiner

*Primary Examiner* — Krishnan S Menon
(74) *Attorney, Agent, or Firm* — Dinsmore & Shohl, LLP; Monika J. Hussell, Esq.

(57) ABSTRACT

The present invention provides a new and improved system for on-site and on-demand production of sterile water for injection (SWFI) from potable water or water that meets the EPA drinking water quality upon preconditioning, in conjunction with reconstitution of IV fluids using dry chemicals or concentrate pre-filled bags, suitable for use at a site under non-clean room environment conditions, and capable of adjusting feed water temperatures. The present invention includes a water temperature conditioning module, a water preconditioning module, a hydrothermal processor, a fluid staging compartment, and combinations and variations thereof.

22 Claims, 5 Drawing Sheets

SYSTEM FOR FIELD INTRAVENOUS FLUID RECONSTRUCTION

The U.S. Government has certain rights in this invention, as provided for by the terms of contract FA8902-07-C-1012, awarded by the United States Air Force.

BACKGROUND OF THE INVENTION

The present invention relates generally to an intravenous (IV) fluid reconstitution system that is compact, robust, and suitable for use at a site under non-clean room environment and large variations in feed water temperature and/or quality. For field applications, such a device must be not only compact and energy efficient, but also robust and easy to operate. Such a device is referred to herein as the field IV fluid reconstitution (FIVR) system.

During recent major military campaigns and emergencies, the military has encountered logistic problems in collecting, transporting, delivering, and storing units of whole fresh blood before the products become outdated. One possible solution is to develop new techniques to freeze red blood cells to increase storage life. However, reconstitution of the blood from the frozen red blood cells requires special blood washing solutions. To effect this reconstitution, sterile water for injection (SWFI) is needed to prepare the special solutions, partly negating the space-saving and shelf-life advantage of the frozen red blood cells by requiring storage of bags of SWFI that have their own finite shelf-life and logistic issues.

Deployment of IV fluids is also a logistic burden as well as a compromise for immediate medical services needed in various emergency situations. IV fluids are bulky, heavy, and lower priority to deploy by air lift. IV fluids also have limited shelf life, which can be further shortened if they are exposed to extreme environment conditions.

In addition to frozen blood reconstitution, sterile, pyrogen-free water is needed for other medical applications such as washing, irrigation, and preparation of medicated solute for intravenous injection in military or civilian emergency situations.

The SWFI system of the present invention can supply field medical operations with a steady, reliable stream of SWFI on demand and thereby simplify the logistic support of expeditionary forces, reduce the number and cost of supply flights, and liberate precious space aboard Navy ships for other mission-critical equipment and supplies. While the SWFI system was developed to support medical applications such as the production of intravenous fluids, blood washing, and clinical irrigation procedures aboard amphibious assault and hospital ships in the fleet, this technology may also find a considerable civilian market including a number of opportunities in biotechnology and pharmaceutical research laboratories, isolated medical facilities, mobile medical units, and emergency relief operations in case of natural disasters or terrorist attacks.

U.S. Pat. No. 5,484,431 (the '431 patent) by Scharf et al. discloses a system and method for creating at a site, remote from a sterile environment, a parenteral solution. However, the '431 patent primarily deals with the container having a prepackaged amount of solute, rather than the generation of SWFI. The container is constructed and arranged so that sterile water can flow through a port, then a filter, and into the container where it is mixed with the solute to create a parenteral solution that can then be infused into a patient. The only reference to a sterile water source capable of producing sterile water for injection into the '431 container is a system developed for NASA comprising a plurality of filters and beds.

Such a SWFI production system is the subject of U.S. Pat. No. 4,610,790 by Reti et al., which discloses a system for producing sterile water and sterile aqueous solutions by combination of pre-filtration, reverse osmosis, de-ionization and ultrafiltration. Other systems which produce sterile water using pre-filtration, reverse osmosis, and/or de-ionization include GB Patent Application Publication 2,002,736, by Alhauser, U.S. Pat. No. 4,881,661 by Jones and U.S. Pat. No. 6,679,988 by Gsell (the '988 patent). Further, U.S. Pat. No. 5,032,265, by Jha et al. (the '265 patent), describes a method and a system for purifying potable water to produce SWFI, wherein the water passes through a pre-filter, a carbon filter, a reverse osmosis module, a ion exchange filter, and a disposable sterilizing microfilter. U.S. Pat. No. 5,520,816, by Kuepper, discloses a zero waste effluent desalination system, using a reverse osmosis or nanofilter membrane element to desalinate water. Finally, European Patent Application No. EP 1785151 (the '151 Application) of Weatherill discloses a heat sanitization system for a reverse osmosis and filtration system. While the '988 and '265 patents and the '151 Application use a heater to heat water for purposes of sterilizing the system, each of these prior art devices fail to use heat sterilization for the production of product water (SWFI).

U.S. Pat. Nos. 6,585,890 and 6,858,179 by Li et al. disclose a compact system capable of producing, and the associated process of producing, SWFI from potable water, that could serve as a sterile water source at a site, remote from sterile environments. Specifically, the system and process disclosed comprises three phases: 1) hydrothermal processing for sterilization and depyrogenation of the potable water; 2) multi-stage flash evaporation for salt removal and heat recovery; and 3) in-situ filtration for particle removal. Similarly, U.S. Pat. No. 6,485,649, by Terava et al., teaches a method and a device for the production of sterile water, using a heat sterilizer, a pump, and a filter unit to purify the water. None of these patents include the use of de-ionization beds or reverse osmosis membranes, and therefore are unable to efficiently generate SWFI from large variations in feed water quality and temperature as a transportable system.

U.S. Pat. No. 7,122,149 (the '149 patent) by Li et al. discloses an energy efficient and compact SWFI generator that incorporates an effective process control mechanism to maintain process temperature, pressure, and water flow rate. The '149 patent specifically discloses and enables a hydrothermal processor module which is useful in the system of the present invention, and is incorporated herein by this reference.

U.S. Pat. No. 4,072,610, by Gow et al. (the '610 patent), presents a method and an apparatus for the production of sterile aqueous solutions with water and concentrate, using a pre-filter, a reverse osmosis column, a deionizer, and a heat sterilizer to create a sterilized solution of water and other, usually medicinal, fluid. Gow et al. discloses heat sterilization of the product at 150-160° C., a very high temperature range requiring substantial energy; further, the Gow invention fails to recognize the necessity for adjusting the temperature of the feed water, prior to deionization, and provides only a single feedback loop for the retentate, which may include product overflow.

Conventional technologies dealing with automatic aseptic bag filling primarily focuses on fixed facility and large equipment. For instance, U.S. Pat. No. 4,730,435 by Riddle et al. disclosed a sterile docking system for aseptically filling IV bags in non-clean room environments, whereby the sterile docking unit of the invention positions over an IV bag and directs HEPA filtered air around the nozzle and diaphragm of the bag to create a clean room environment.

Most of the prior art patents do not include means to heat the feed water prior to entering the filtration beds (except for purposes of sanitization). While, Jha et al., describes a method for pre-heating the tap water with heat from the rejected water, as well as using a heater. Jha et al. does not contemplate a heater capable of adjusting the temperature of the feed water where the initial temperature varies, nor does it contemplate cooling the feed water.

Furthermore, none of the prior art patents use a multi purpose surge tank to provide a second retentate recycle loop, capture steam and hot water from the hydrothermal processor module, and provide for bottled water input into the system. Weatherill uses a surge tank only for purposes of receiving pure water and disbursing the same during sanitization, and Gow discloses a surge tank for purposes of receiving retentate as a first feedback loop, and overflow product water which includes medical compositions.

In addition, none of these patents are designed for use in a myriad of field conditions. For example, the temperature of feed water in the field may vary significantly from just above the freezing point to temperatures encountered in a desert environment. This temperature variation could range from 33-140° F. (0.6-60° C.). However, the temperature range recommended by manufacturers of pre-filters, reverse osmosis membranes, and de-ionization resin beds typically is 45-113° F. (7-45° C.). Therefore, a temperature conditioning system is desirable to adjust feed water temperature to within a suitable temperature range when reaching the water preconditioning module.

There is also a preferred range of SWFI temperature for reconstitution of IV fluids and subsequent or immediate administration of such fluids to patients. This temperature is likely to be in the range from about 15° C. to about 55° C., preferably from about 35° C. to about 45° C. (i.e., about body temperature). The basic control and regulation of the temperature of SWFI are part of the hydrothermal fluid processor disclosed in the '149 and '610 patents which only addressed cooling the SWFI when the temperature of the feed water was near ambient conditions (i.e., about 60-80° F. (15-27° C.)) encountered in household tap water supply. Specifically, embodiments disclosed in each of these patents include a heat exchanger for heating feed water and cooling SWFI; however, the heat exchanger will only cool the SWFI to a temperature range based upon the feed water temperature. No further controls are included to modify the temperature of the SWFI to a specific temperature range regardless of the temperature of the feed water. By design, the temperature of SWFI coming out of the hydrothermal fluid processor is higher than that of the feed water. Therefore, the prior art could not provide SWFI within an acceptable temperature range if the feed water temperature is excessive (i.e., over 113° F. or 45° C.). The '151 Application contemplates mixing cold and hot tap water for injection into the system, but the only functionality described with this temperature control is that cold water is used to cool down the system after heat sterilization.

The FIVR system in which the present invention is incorporated consists of three basic component technologies: (A) an SWFI generator that produces SWFI on site and on demand from potable water or water that meets the EPA drinking water quality upon preconditioning; (B) sterilized bags pre-filled with dry chemicals or concentrate prepared for reconstitution with SWFI; and (C) a feed water temperature conditioning assembly.

The SWFI generator technology disclosed in the '149 patent presents the design basis for compact and energy efficient systems. However, the issues associated with maintenance, automation, robustness, ease of operation, variations in feed water temperature, and use of bottled water as the feed water source were not resolved by the technologies, teachings and methods of the '149 patent.

It is an object of the invention to provide an improved system for on-site and on-demand production of SWFI from potable water or water that meets the EPA drinking water quality upon preconditioning, and in conjunction with reconstitution of IV fluids using dry chemicals or concentrate pre-filled bags in a safe, expedient, and effective manner suitable for use at a non-clean room or pseudo clean room environment site and subject to large variations in feed water temperature and/or quality.

It is a further object of the invention to provide a system and method for achieving a robust and fail-safe system that can be turned off at any time, as a result of power failure or intentional or unintentional human intervention, without damaging system components or injuring operators due to high temperature steam released from the system, or releasing high temperature water.

It is another object of the invention to provide a system and method for using bottled water as the feed water to produce SWFI.

It is another object of the invention to provide a system and method for cooling feed water, including by refrigeration systems with radiator cooling devices.

It is another object of the invention to provide a system and method for producing SWFI within a desirable temperature range.

These and other objects of the invention will become apparent as a general description of the present invention and detailed description of representative embodiments proceeds.

SUMMARY OF THE INVENTION

The present invention provides a new and improved system for on-site and on-demand production of SWFI from potable water or water that meets the EPA drinking water quality upon preconditioning, in conjunction with reconstitution of IV fluids using dry chemicals or concentrate pre-filled bags, in a safe, expedient, and effective manner suitable for use at a non-clean room environment site, and capable of accommodating large variations in feed water quality, and adjusting feed water temperatures. The present invention further provides a system and method for achieving a robust and fail-safe system that can be turned off at any time without damaging system components due to high temperature steam released from the system, or releasing high temperature water. In some embodiments of the present invention, bottled water may be used as the feed water to produce SWFI. In those or other embodiments, a system and method for cooling feed water by vacuum evaporation with or without combining radiator cooling devices or other refrigeration systems is provided. Similarly, embodiments of the present invention may include means to adjust the temperature of the SWFI within a desirable temperature range.

The present invention comprises, generally: a water preconditioning module, a hydrothermal processor, and a fluid staging compartment; some embodiments further comprise a water temperature conditioning module and/or an SWFI temperature conditioning module.

The water preconditioning module of the present invention, designed and configured to remove a substantial amount of impurities from feed water, generally comprises a pump for drawing and pressurizing feed water to one or more reverse osmosis (RO) membranes. These membranes partition the water into a filtrate and a retentate, where the filtrate continues along a flow-path to pass through one or more de-ionization (DI) resin beds. The water preconditioning module may include a prefilter, such as an activated carbon bed, in the flow path of the feed water at the upper stream of the pump to substantially remove organic compounds, chlorine, particulates, and other impurities that could otherwise shorten the service life of the RO membranes. Furthermore, the water preconditioning module is designed and configured with a flow restrictor that recirculates a portion of the retentate to the inlet of the primary pump; and a second flow restrictor that regulates the amount of retentate that is discharged from the module. However, under high feed water temperature conditions the water preconditioning module may comprise an evaporation device.

The hydrothermal processor module of the present invention comprises a heat exchanger that allows the filtrate from the RO and DI to flow through and recover thermal energy from the sterile water for injection (SWFI); a reactor that exposes the filtrate to high temperature for sterilization and depyrogenation to form SWFI; a heater that provides thermal energy to the reactor; a plurality of valves to divert steam to the aseptic bag filling interface for sterilization of the down stream system components during start-up and control flow of the SWFI; and a fixed flow restrictor that maintains the fluid pressure required for the fluid processor. This module may include SWFI temperature conditioning means to cool the SWFI to a temperature range suitable for immediate use.

The fluid staging compartment of the present invention generally comprises a tank that serves several functions, including (1) as a reservoir for retentate, temperature conditioned water, and/or SWFI overflow, (2) as a surge protection for steam overrun during an emergency shut down procedure, and (3) in some embodiments, as a feed tank for feed water or bottled water addition. This module further generally comprises a drain valve and a recirculation pump, to provide a second recirculation loop to recirculate water within the system and in some embodiments to add water into the system. Thus, the fluid staging compartment is multi-functional, designed and configured to achieve all-in-one capability.

The present invention can further comprise means to heat and cool the incoming feed water to maintain the temperature of water within the specifications of any prefilter, RO membranes, and DI resin beds.

BRIEF DESCRIPTION OF THE DRAWINGS

The invention will be more clearly understood from the following detailed description of representative embodiments thereof read with reference to the accompanying drawings, wherein.

DETAILED DESCRIPTION

As described generally above, the present invention includes some or all of the following: a water preconditioning module, a hydrothermal processor module, a fluid staging compartment, a feed water temperature conditioning assembly, and SWFI temperature conditioning means, providing an intravenous fluid reconstitution system that is compact, robust and suitable for on-site and on-demand use at a site under non-clean room environment conditions and large variations in feed water temperature and/or quality.

Figure 1:
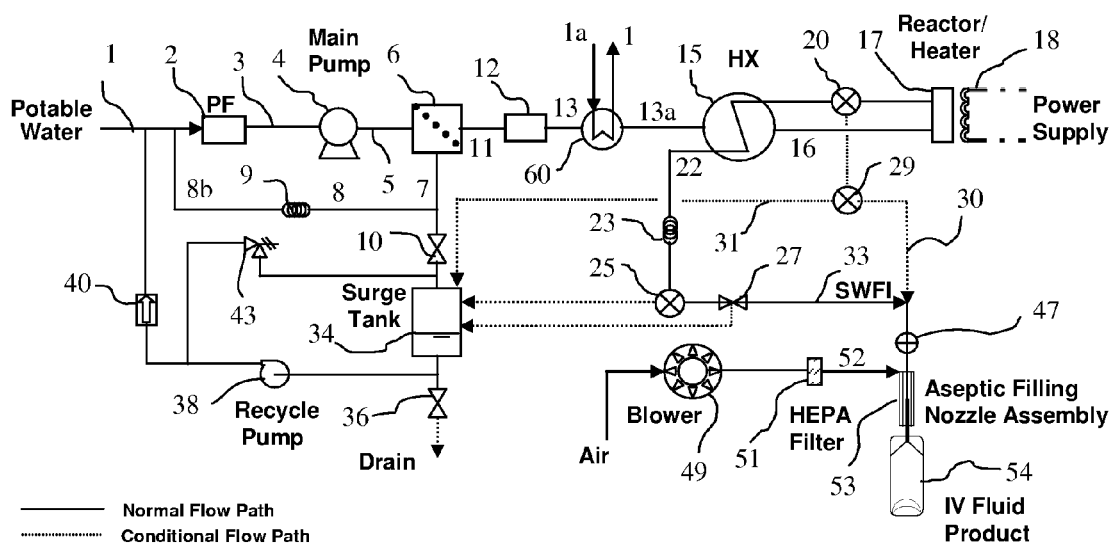
FIG. 1 is a process flow diagram of an embodiment of the system of the present invention.

The water preconditioning module of the present invention removes most impurities from the feed water. As shown in FIG. 1 hereof, this module comprises a main pump 4 for drawing and pressurizing feed water 1 through a pre-filter 2 (preferably an activated carbon pre-filter), and is the driving force to pass feed water through the entire system of the present invention. The main pump 4 may further provide sufficient pressure to prevent the water that flows through the hydrothermal processor module from boiling. This high-pressure feature permits the hydrothermal processor module to be highly effective to achieve sterilization and depyrogenation of feed water, and yet remain compact and energy efficient.

The filtered water 3 is drawn through the main pump 4, and the pressurized water 5 passes through and is partitioned by one or more reverse osmosis (RO) membranes 6 into a filtrate 11 and a retentate 7, where the filtrate continues along a flow-path to and through an ion exchange resign bed 12 for de-ionization (DI), thereby forming de-ionized filtrate 13. The RO membrane diverts and removes the retentate 7 (the portion of the feed water that does not pass through the RO membrane) from this flow path.

The retentate 7 is further partitioned into a first high-pressure portion 8 for direct recycling by means of a fixed flow restrictor 9, to render a low-pressure water stream 8$b$ to be combined with the feed water 1 for recirculation through the water preconditioning module; and a second high-pressure portion that is regulated by the adjustable pressure relief valve 10 (preferably spring loaded) to expel retentate from the module, into the surge tank 34 of the fluid staging compartment, as hereinafter described. The valve 10 is set to be activated at a preselected pressure that is determined by factors within the system including water temperature, pressure, flow rate, and hydrothermal reactor volume.

Figure 9:
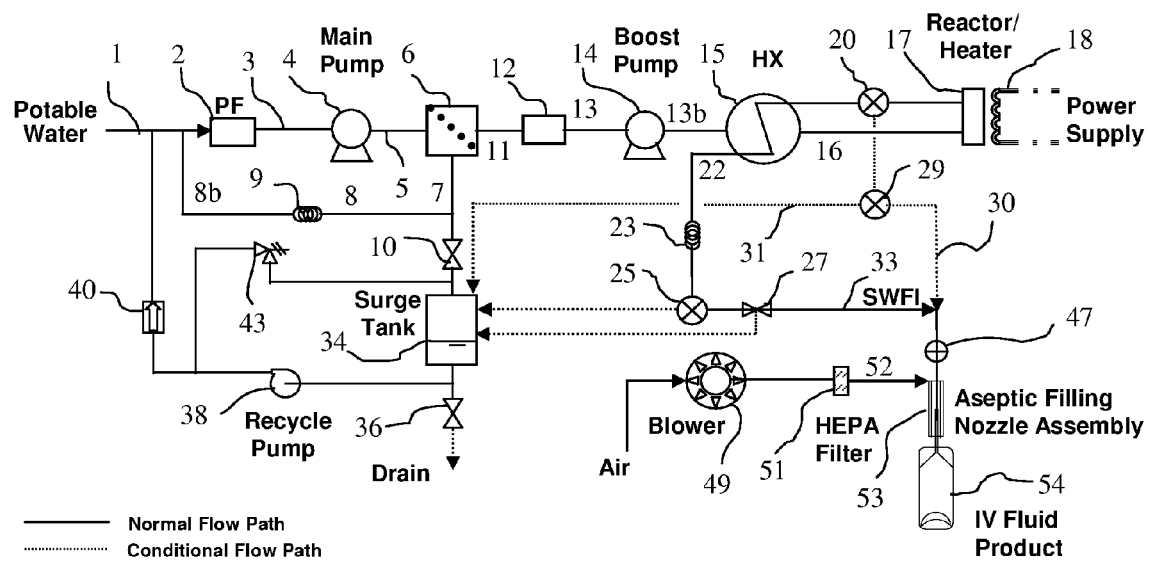
FIG. 9 is a process flow diagram of another embodiment of the system of the present invention.

For SWFI production purposes, these unit operations are typically arranged in the aforementioned sequence, although other arrangements are also possible. For example, in some embodiments where temperature of the feed water needs to be adjusted prior to entering the water preconditioning module, the pre-filter 2 may be relocated to the onset of the feed water source. It is also possible, as another example as shown in FIG. 9, that the main pump 4 is used to push the feed water through the RO and DI units at low-pressures (about 100 to 300 psig), and a secondary (boost) pump 14 is used to deliver the deionized filtrate to the hydrothermal processor module at higher pressures (about 300-1500 psig) required for preventing water from boiling. This dual pump embodiment is preferred for larger scale operations where reduction of pressure ratings for the vessels for RO and DI units can easily off set the costs for the secondary pump and additional process control requirements. The single pump design requires a relatively large high-pressure pump, while the dual pump design requires a relatively large low-pressure pump and a second relatively small high-pressure pump, since the filtrate stream pressurized by the secondary pump is a fraction of the feed water pressurized by the primary pump.

As shown in FIGS. 1-5 and 10, in some embodiments water temperature conditioning modules may be coupled with or integrated into the water pre-conditioning module to heat and/or cool the incoming feed water to maintain the temperature of the water within the specifications of the pre-filter 2, the RO membranes 6, and the DI resin bed 12. These modules are also referred to herein as water temperature conditioning modules and temperature adjusting means. Suitable heating means include house-hold compact and tankless hot water heaters, and suitable cooling means include a combination of forced air radiator and vacuum evaporation, as well as refrigeration systems.

Although the temperature specifications of the pre-filter, RO membranes and DI resin beds vary by manufacturer and product line, generally they require or recommend a temperature range of 45-113° F. (7-45° C.) for RO membranes and DI beds. The prefilters can typically tolerate wider temperature ranges (both higher and lower temperatures for a given filter) than the RO and DI units, and therefore, in some embodiments, the prefilters may be located at the upper stream of the temperature conditioning module. RO membranes designed for seawater desalination can tolerate temperature below 32° F. There are also high-temperature RO membranes suitable up to 180° F. However, no single RO membrane be used in such a large temperature range without compromising system performance because the rate of RO filtrate will decrease as the water temperature reduces at a rate of 3% per 1° C. temperature drop.

An embodiment of a water temperature conditioning module which heats the feed water is shown in FIG. 1, comprising a heat exchanger 60, wherein the cold feed water 1*a* supplied to the system of the present invention passes through the heat exchanger 60, and is heated by the deionized filtrate 13, thereby producing warmer potable water 1, as feed water for the system, and cooler deionized filtrate 13*a* which passes on to the hydrothermal processor module.

Figure 2:
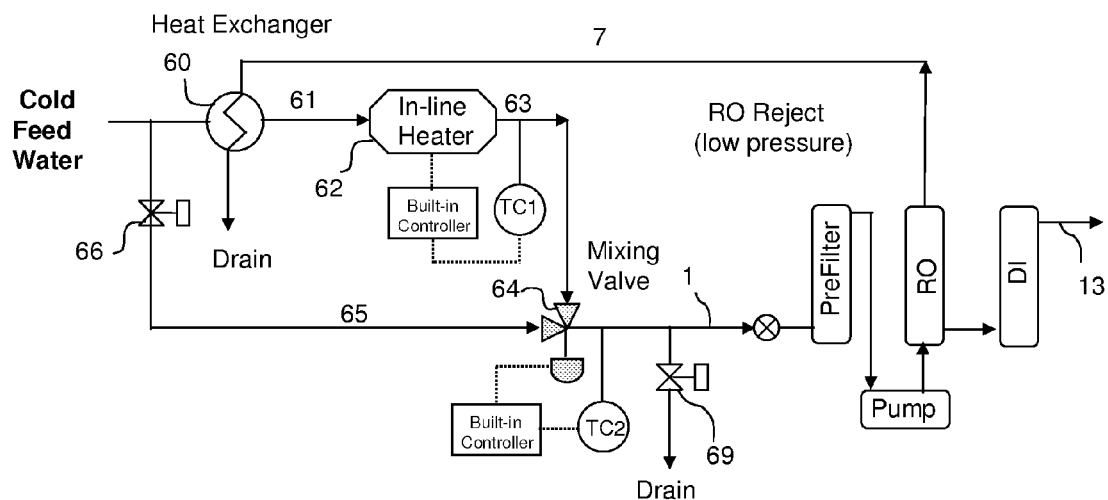
FIG. 2 is a flow diagram of an embodiment of a feed water temperature regulator incorporating a heater, in association with a water preconditioning module.

Another embodiment of a water temperature conditioning module which heats the feed water is shown in FIG. 2. This embodiment is designed to heat low temperature feed water (less than about 45° F. or 7° C.). In this embodiment, the incoming cold feed water passes through a compact heat exchanger 60 (of tube-in-tube, plate-and-frame, shell and tube or microchannel type, whichever is suitable in terms of size, weight, efficiency, duty, and cost) where it is preheated directly by the retentate stream 7 from the water preconditioning module, under low pressure. In this case, the retentate stream 7 is drained (as shown in FIG. 2), can be returned to the water supply source 1 or can be expelled to the surge tank 34. Alternatively, a portion of the temperature pre-conditioned water may be used to preheat the feed water by means of the heat exchanger 60. This preheated feed water 61 then enters an in-line water heater 62 that has a built-in controller (such as a thermocouple TC1) or input/output signals connected to a programmable logic controller (PLC) to adjust the temperature of the output water 63 to a desired temperature (preferably higher than the ultimate desired temperature of the heated feed water, as the same shall be cooled as hereinafter described).

To improve the temperature stability of the water entering the water preconditioning module, a portion 65 of the cold feed water can be diverted from the source, through a valve 66, and then blended with the hot water from the heater 63, by means of a thermostatic mixing valve 64. The thermostatic mixing valve 64 is preferably based on a bimetal design that effectively compensates for temperature fluctuation in both the hot water stream 63 and cold water stream 65. The rate of cold feed water 65 and heated water 63 injected into the mixing valve 64 is controlled by a thermal control mechanism built into the mixing valve. The valve 64 may be equipped with a trim set that allows temperature control to within 5° F. of either inlet supply (the heated water 63 or the cold feed water 65), along with an integral maximum-temperature limit stop and single-temperature locking option. Once the heated water 63 and the cold feed water 65 are mixed to a desired temperature, the water 1 is drawn into the rest of the water preconditioning module by the main pump 4, as hereinabove described.

The blending of the hot and cold streams to achieve a desired temperature can also be achieved by using a conventional process control loop where the thermostatic mixing valve 64 is replaced by an electrical or pneumatical three-way servo valve using temperature output signals (such as a thermocouple TC2) as feedbacks to a programmable logic controller (PLC). A drain 69 can be incorporated in this water temperature conditioning module to allow water to be removed from this module when the rest of the water preconditioning module is not in need of water, or to clean the system upon shut-down.

In general, it is more challenging to deal with feed water having high temperatures than low temperatures. First, cooling means powered by electricity have much lower efficiency than that of electrical resistance heating. Second, long exposure of unconditioned feed water at high temperatures is more likely to shorten service life of RO and DI elements, and cause material damages that disable the function of RO and DI. Therefore, several cooling embodiments of the temperature conditioning module of the present invention are described below.

Figure 3:
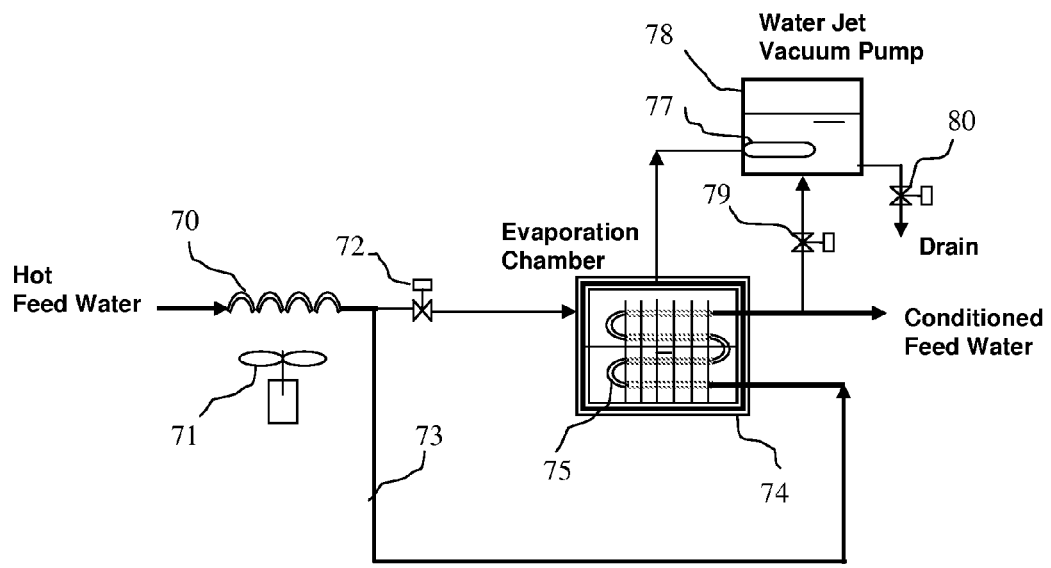
FIG. 3 is a flow diagram of an embodiment of a feed water temperature regulator incorporating a vacuum evaporation device.

In the embodiment as shown in FIG. 3, the incoming hot feed water is first pre-cooled by passing through radiator type heat exchanger (shown as a radiator coil 70 with heat dissipating fins, where ambient air is forced through the fins by a fan 71). The bulk of the precooled feed water 73 enters a second radiator type heat exchanger 75, which is housed in a sealed and insulated container 74. A small stream of the precooled feed water is diverted to the sealed and insulated container 74 by means of a regulating valve 72 to provide water that undergoes vacuum evaporation in the container. A water jet vacuum pump 78 (i.e., a container in which a water jet is installed to operate), including a water jet 77, is used to reduce the pressure in the container 74. The design of water jet 77 is based on Venturi concept where water is pumped by the water jet through a Venturi tube at high velocity to create a vacuum. This type of vacuum pump is commonly used as an aspirator or bench-top vacuum evaporator. As the pressure is reduced, the water in the container 74 supplied from valve 72 begins to evaporate, thereby removing heat from the water and lowering the surface temperature of the heat exchanger 75, which in turn reduces the temperature of water passing through the second radiator type heat exchanger 75. At normal atmospheric pressure (760 mmHg), the boiling point of water is 212° F. (100° C.), and as the pressure reduces, the boiling point of water decreases. In order to reduce the temperature below about 110° F. (43° C.), the pressure in the container 74 should be maintained below 72 mmHg.

As shown in FIG. 3, this vacuum can be created by a water aspirator 77 housed in the container or reservoir of the water jet vacuum pump 78. The water vapor evaporated from the container 74 is transported and condensed in the reservoir 78. As a result, the temperature of the water in the reservoir 78 will rise over time, making the vacuum less effective. Therefore, valves 80 and 79 can be actuated periodically to drain the hot water from the water reservoir, and inject cold water cooled by the radiator type heat exchanger 75 into the reservoir. Alternatively, salt may be placed within the reservoir. The lower-temperature water cooled by this embodiment of a water temperature conditioning module is then drawn from the heat exchanger 75 into the water preconditioning module by primary pump 4.

Figure 4:
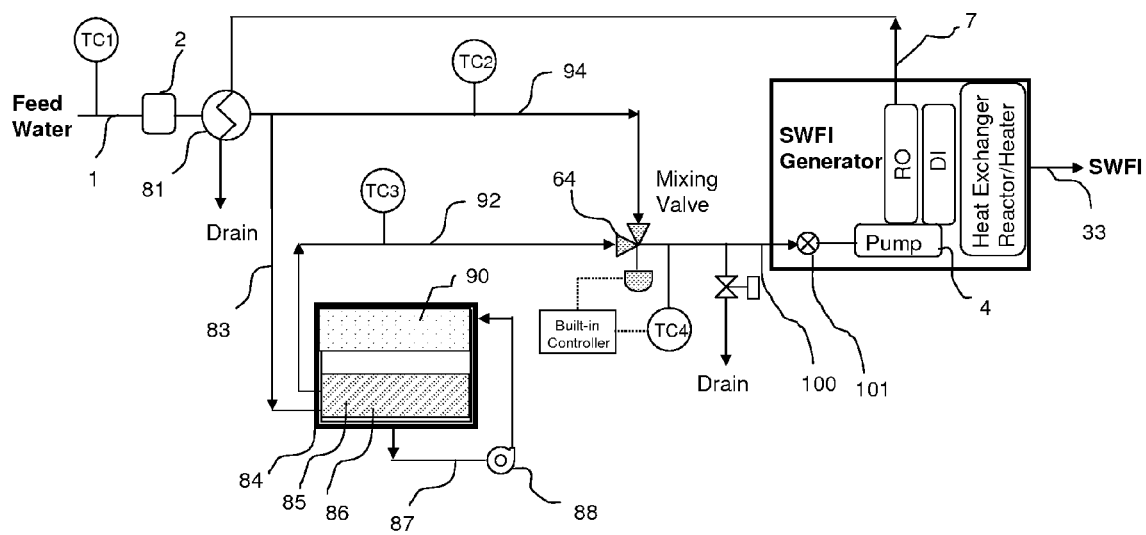
FIG. 4 is a flow diagram of an embodiment of a feed water temperature regulator incorporating a refrigeration device.

FIG. 4 illustrates another embodiment of a water temperature conditioning module for cooling feed water, using a refrigeration system. In this embodiment, the refrigeration system cools a heat transfer fluid 85 in an insulated container 84. The hot feed water is first cooled by retentate via heat exchanger 81, which retentate can then be drained from the system (as shown), returned to the water inlet 1, or expelled to the surge tank 34. Then, a portion of the feed water is diverted to a chiller heat exchanger 86 by means of line; once chilled, the feed water is transferred by line to a thermostatic mixing valve 64. The refrigeration device 90 (such as an ice maker) incorporated into the refrigeration system can be built based on the conventional refrigeration loop design, wherein the heat transfer fluid is cooled by means of a heat exchanger and a refrigerant, and the heat generated therefrom is discharged into the ambient air. The heat transfer fluid 85 circulates through the refrigeration device 90, and then falls to and accumulates at the lower portion of the insulated container 84, during use or during idle time of the FIVR system. When water is used as the heat transfer fluid 85, ice can be formed in some refrigeration devices 90, and then falls to the lower portion of the insulated container 84. Once the feed water flows through the chiller heat exchanger 86, the heat transfer fluid is warmed, or the ice begins to melt. The heat transfer fluid or water 87 may then be removed from the insulated container 84 and drawn by a recirculation pump 88 to the refrigeration device 90 to continue producing cold transfer fluid/ice.

When using water as the heat transfer fluid within the refrigeration device 90, depositing ice within container 84, the rate of cooling (determined by the amount of ice production by the refrigeration device 90, the temperature of the partially cooled feed water 83, and the amount of feed water being cooled at a particular time), can be designed to be less than what is required by the system at a given time during the active production of SWFI. The deficit in cooling capacity can be made up by the accumulated ice in container 84 produced during the FIVR system down time (i.e., when the system is not being used). Preferably, the volume of the insulated container 84 is sufficiently large to support 8 hours of operation (thus the ice can be produced during the 16 hours of down time for any given 24 hour shift). For longer hours of operation, the ice maker must produce additional ice, and therefore will be larger.

As described above, the heat transfer fluid 85 (which is not in direct contact with the feed water) can be water, aqueous salt solutions, organic compounds or solutions, and ionic liquids, which may have a freezing point higher or lower than water. This method allows increasing and decreasing the temperature difference between the cooling solution 85 and the feed water 83, respectively. The heat transfer fluid may or may not undergo phase changing from liquid to solid when in contact with the refrigeration device.

The cold stream 92 and a diverted hot stream 94 of the feed water are combined by the mixing valve 64, which has a built-in bimetal mechanism to produce the water at a preset temperature range as described in previous embodiments. Thermocouples (TC1, TC2, and TC3) are used to monitor the process water temperature and as feedback for process control. A drain port may be equipped at the junction point between the water supply from the mixing valve 64, and the water preconditioning module, for sampling and/or draining water from the water temperature conditioning module. Furthermore, a solenoid valve 101 for PLC activated automatic open or close of the connection of the temperature conditioned water supply 100 to the system may be incorporated into this and other embodiments of the water temperature conditioning module and the water preconditioning module.

FIG. 4 also illustrates a configuration that positions prefilter 2 prior to the water temperature conditioning module, since its placement is less critical, as most prefilters have wider range of operating temperatures than those of the RO membranes and DI resin beds. This configuration can be incorporated into any of the water temperature preconditioning modules.

Figure 8:
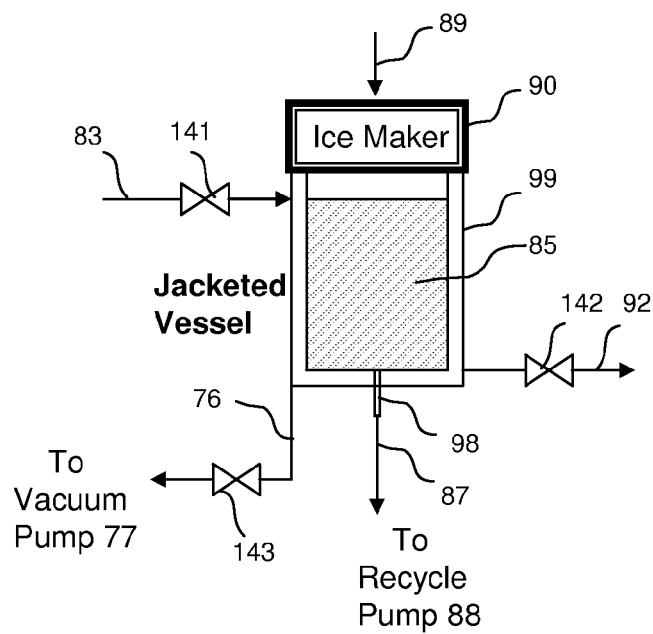
FIG. 8 is a flow diagram of an indirect ice chill process for cooling feed water.

As an alternative to FIG. 4, the indirect chill process shown in FIG. 8 may be incorporated as the refrigeration device of FIG. 4. In this embodiment prechilled water 83 follows through a valve 141, into the jacketed vessel 99, preferably made of metallic materials for high strength and heat transfer coefficient, installed beneath the refrigeration device 90 which continuously discharges ice or chilled heat transfer fluid 85 into the jacketed vessel 99. Under normal operating conditions, the valve 142 is open while valve 143 is closed so that the incoming water from valve 141 is cooled in the interior of the jacketed vessel 99 and leaves as a cold water stream 92 for further processing through the mixing valve 64. The chilled transfer fluid increases in temperature as the feed water is chilled, and can be drained through conduit 98 by the recirculation pump 88, and resupplied to the intake 89 of the refrigeration device 90. When the system is under idle or shut down conditions, valves 141 and 142 are closed, while valve 143 is open to drain water and draw a vacuum between the jacketed vessel walls by means of a pump, thus the jacketed vessel 99 serves as a thermo insulator to store ice or chilled transfer fluid that is being continuously generated preferably until vessel 99 is full and the next service cycle begins.

Finally, the feed water may be cooled by cooling means including a refrigeration device, where at least a portion of the feed water is continuously passing through the surfaces in contact with the refrigerant of the refrigeration device.

Figure 10:
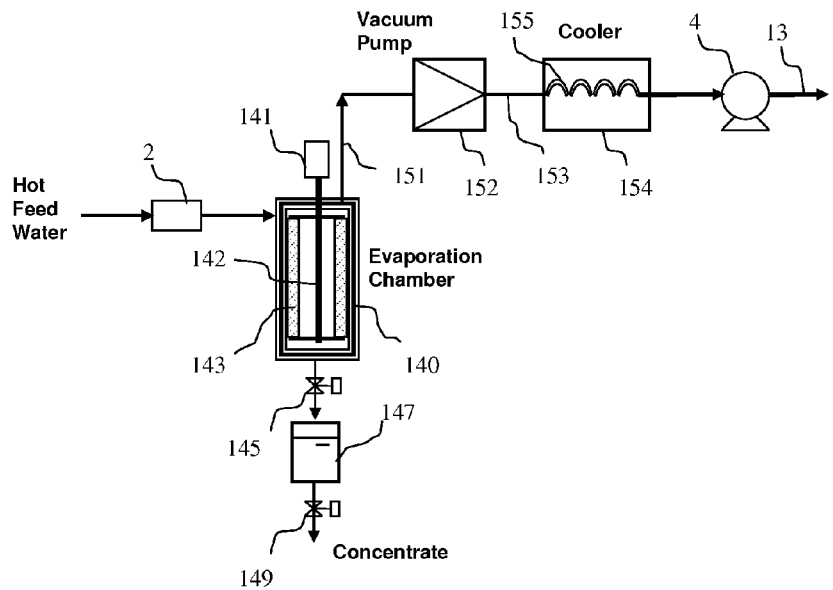
FIG. 10 is a process flow diagram of a rotating, thin film evaporation system of an embodiment of the water pre-conditioning module of the present invention.

If the feed water temperature is substantially higher than about 100° F., it may be desirable and practical to use a vacuum distillation system instead of an RO and DI system to remove electrolytes (i.e., dissolved solids). FIG. 10 shows an embodiment that employs a rotating, thin-film evaporation device. The incoming hot feed water first passes through a prefilter 2, and enters to the evaporation chamber 140. The water flows downward along the inside wall of chamber 140. A roller assembly comprising a motor 141, a rotating shaft 142 and a set of individual rollers 143 that roll against the inside surface of chamber 140, is used to enhance the rate of evaporation as result of the thin film surfaces created on the inside surface of chamber 140 and surfaces of the rollers 143. The water vapor 151 is drawn out of chamber 140 by a vacuum pump 152. The vapor and/or vapor/liquid two-phase flow 153 is cooled by a water or air cooler 154 through the surfaces of heat exchanger (finned radiator or coiled tube) 155, such that water condensate is formed and fed into pump 4. The output stream 13 can be fed directly into the hydrothermal processor module. The residue water in the evaporation chamber 140 drains into a concentrate holding tank 147 via valve 145, which is normally open during operation. The drain valve 149 is normally closed, until the water level in the tank 147 reaches a critical level. Periodically, valve 145 is closed, and valve 149 is open to allow the fraction of feed water (concentrate) that contains dissolved solids to leave the system. The evaporation chamber 140 may be insulated.

As shown in FIG. 1, the hydrothermal processor module of the present invention (described in the '149 patent) comprises a heat exchanger 15, and a reactor 17 coupled with a heater 18, wherein the heater provides thermal energy to the reactor. The hydrothermal processor module facilitates the flow of the filtrate from the DI 12 through the reactor 17, which sterilizes and depyrogenates the preconditioned water, at high temperatures—thereby generating SWFI. Further, the heat exchanger 15 recovers thermal energy from the SWFI after exposure to high temperatures at the reactor 17 by exchanging heat from the SWFI with the preconditioned water 13a. Preferably, the heat exchanger 15 is based on a tube-in-tube design, with the preconditioned water 13a on the shell side, and SWFI on the tube side.

The main pump 4 of the water preconditioning module provides sufficient pressure (200-1500 psig) to prevent the water that flows through the hydrothermal processor from boiling. This high-pressure feature permits the hydrothermal processor to be operated at temperatures higher than typical autoclave sterilization temperature of 121° C. (250° F.), and therefore is highly effective in sterilization and depyrogenation of the water being processed with short retention time, resulting in a compact and energy efficient fluid processor to produce SWFI.

A series of valves and a restrictor control the flow of water within and from the hydrothermal processor module. Specifically, as shown in FIG. 1, a first three-way valve 20 between the reactor 17 and the heat exchanger 15 is used to divert steam to the bag filling interface for sterilization of the aseptic filling nozzle interface during start-up. Bypassing the heat exchanger 15 allows the steam to reach down-stream components, without being cooled down. A second three-way valve 29 works in concert with the first valve 20, to direct steam from the reactor to either the aseptic bag filling interface, or to the surge tank 34. Thereafter, during normal operation, the three-way valve 20 directs the SWFI toward the heat exchanger 15, which will cool down the SWFI. From the heat exchanger 15, the SWFI 22 passes to a fixed flow restrictor 23 that, with the main pump 4, maintains the fluid pressure required for the hydrothermal processor module.

In order to allow a safe temporary or emergency stop of the system, a third three-way valve 25 can be incorporated into this module, which will divert the stream 24 to the surge tank 34 in such a situation. All of these three-way valves 20, 25 and 29 are actuated electrically or pneumatically by electronic feedbacks from the processing parameters preselected in the design of a specific system, based upon components and anticipated conditions. Processing parameters may include temperature, pressure, flow rate, and conductivity of water. These valves are also preferably designed to have options to be fail-open or fail-close reference to the outlet that will open or close when electricity or compressed air is cut off. In such cases, the flow of high-temperature water or steam is directed to the surge tank 34. Since one of the features of the hydrothermal processor is its compactness, the internal volume of the reactor and the heat exchangers is much less than the volume of the surge tank 34 so that all steam and/or hot water in the hydrothermal processor upon releasing can be contained in the surge tank 34 without significant increase in the vapor pressure in tank 34.

Since the flow restrictor 23 is set to let down the process pressure under normal flow conditions, the down stream pressure may build up if the flow rate is reduced and/or the SWFI output is stopped, i.e., valve 47 is in the closed position at the time when IV bags are switched. Therefore, a pressure relief valve 27 is incorporated into this module to ensure that the pressure in the SWFI line 33 is maintained at a pre-selected level (typically ranging from 10 to 30 psig) under any operating or abnormal condition.

Figure 6:
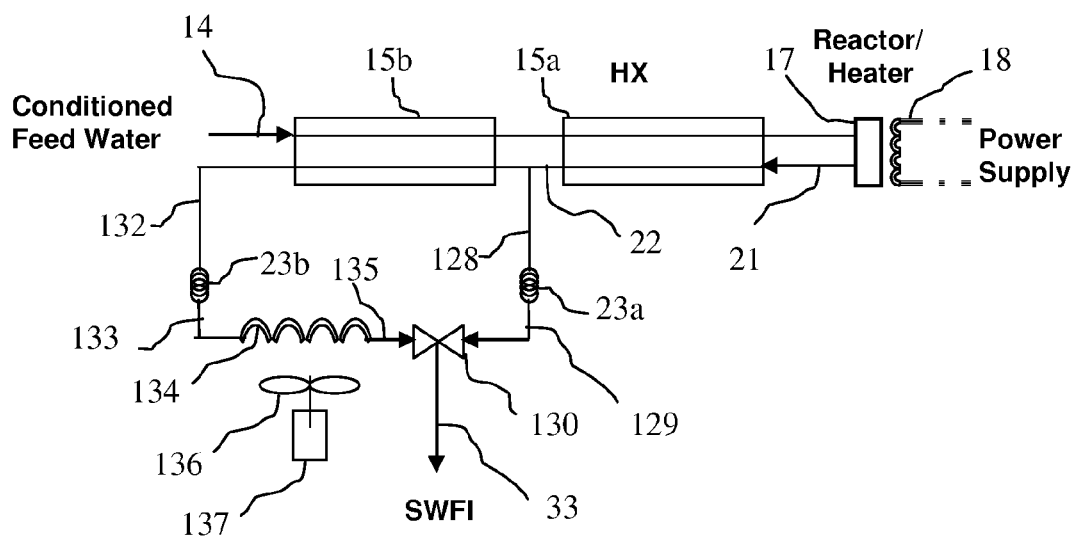
FIG. 6 is a flow diagram of a process for regulating SWFI temperature in the hydrothermal processor module.

In some embodiments, the hydrothermal processor may provide means to control the temperature of SWFI, which can be particularly useful when there are substantial temperature variations in feed water to the FIVR system. These means include incorporating a second heat exchanger (as shown in FIG. 6). In this embodiment, preconditioned feed water 13 from the RODI processes flows through the second heat exchanger 15b and the first heat exchanger 15a before entering the reactor 17. The SWFI from the reactor is then first cooled by the first heat exchanger 15a, and split into two streams. One stream flows down to the fixed flow restrictor 23a to reduce the pressure before reaching the mixing valve 130 as the hot water input stream 129. The other stream continues to be cooled by the second heat exchanger 15b followed by pressure let down through a second fixed flow restrictor 23b. This stream continues to pass through a finned radiator 134 which is cooled by a fan 136 by force convection. This colder stream 135 reaches the mixing valve 130 as the cold water input stream. The mixing valve 130 performs the function of mixing the cold and hot streams to achieve a desired temperature. The mechanism of the mixing valve 130 is based on a bimetal thermostatic design and can be pre-adjusted to a desired temperature. An example of such thermostatic water mixing valves suitable for use in the present invention is represented by the ones [Type TM] manufactured by Leonard Valve Co or [RADA Model 215] by Armstrong. In addition, the temperature feedbacks from all three streams can be fed back to a controller which regulates the on-off and the speed of the motor 137, to further control the desired temperature of SWFI. The SWFI with the desired temperature (preferably near body temperature 35° C.-45° C.) is then directed to the three-way valve 25 as shown in FIG. 1. Valves 20 and 29 can be incorporated into this embodiment as shown in FIG. 1.

Figure 5:
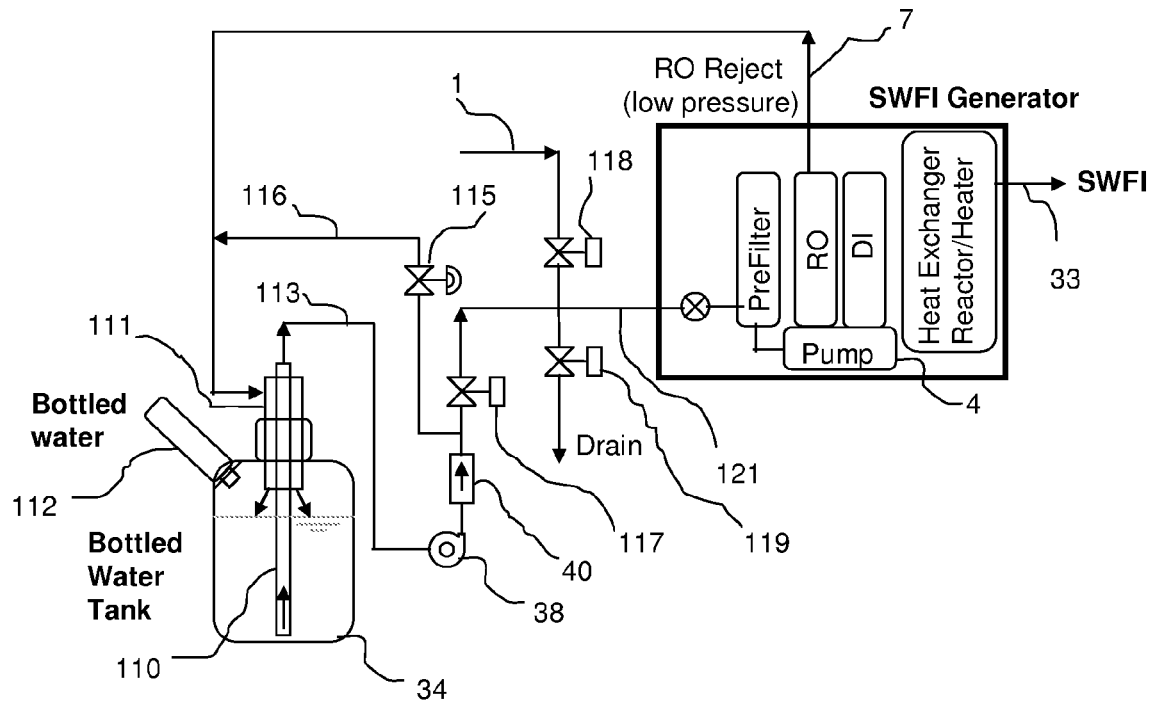
FIG. 5 is a flow diagram of an embodiment of a water preconditioning module and a fluid staging compartment, incorporating means to transfer bottled water into the system of the present invention.

As shown in FIG. 1, the fluid staging compartment of the present invention generally comprises a surge tank 34 that serves multiple functions, including (1) a reservoir for retentate from the water preconditioning module; (2) a reservoir for SWFI overflow from the hydrothermal processor; (3) a surge protection for steam overrun during a temporary or emergency shut down procedure of the system; and (4) in some embodiments, as shown in FIG. 5, a feed tank for bottled water. Preferably, the surge tank 34 includes a conductivity sensor which measures the quality of the retentate to determine whether to recycle the water through the system or open the drain and reject it via valve 36. Additional sensors may be coupled with the surge tank to measure conditions within the surge tank such as water level, temperature and pressure, and to provide feedbacks for process monitoring and control.

The fluid staging compartment further comprises a recirculation pump 38 which pumps water from the surge tank 34 back to the water preconditioning module water inlet 1; and a check valve 40 to prevent water back-flow between the recirculation pump 38 and the water inlet 1. Further, an adjustable flow restrictor 43 is incorporated between the check valve 40 and the surge tank 34 to return a portion of the water back to the surge tank 34 so that the system remains in a pre-determined, steady state of flow from the surge tank 34 to the water inlet 1.

An alternative embodiment of the fluid staging compartment is shown in FIG. 5, wherein water from the surge tank 34 is pumped form the tank to the check valve 40. In this embodiment the adjustable flow restrictor 43 is incorporated after the check valve 40, and a flow restrictor 115 transmits a portion of the water back to the surge tank 34, with the remainder of the water passing through valve 117. The regular water source 1 is used as the makeup feed water to the recycled water to form the water input 121 to the main pump 4 that feeds the water preconditioning module. The water source 1 may also be used to start up the system, and allow the system to reach a steady state before turning to the bottled water as the main source of water input. A valve 119 is preferably connected to the main water line so that the water can be drained from the system in an emergency or upon standard shut down.

Optionally, as shown in FIG. 5, bottled feed water 112 may be used as the water source for the present invention, wherein the water is directly added to the surge tank 34 via an opening at the top of tank 34, and then mixed with the retentate and other fluids therein. Tap water may also be used as a water source through line 1 and valve 118, either coupled with the bottle feed water 112 or at the feed water intake 1 of the water pre-conditioning module.

Figure 7:
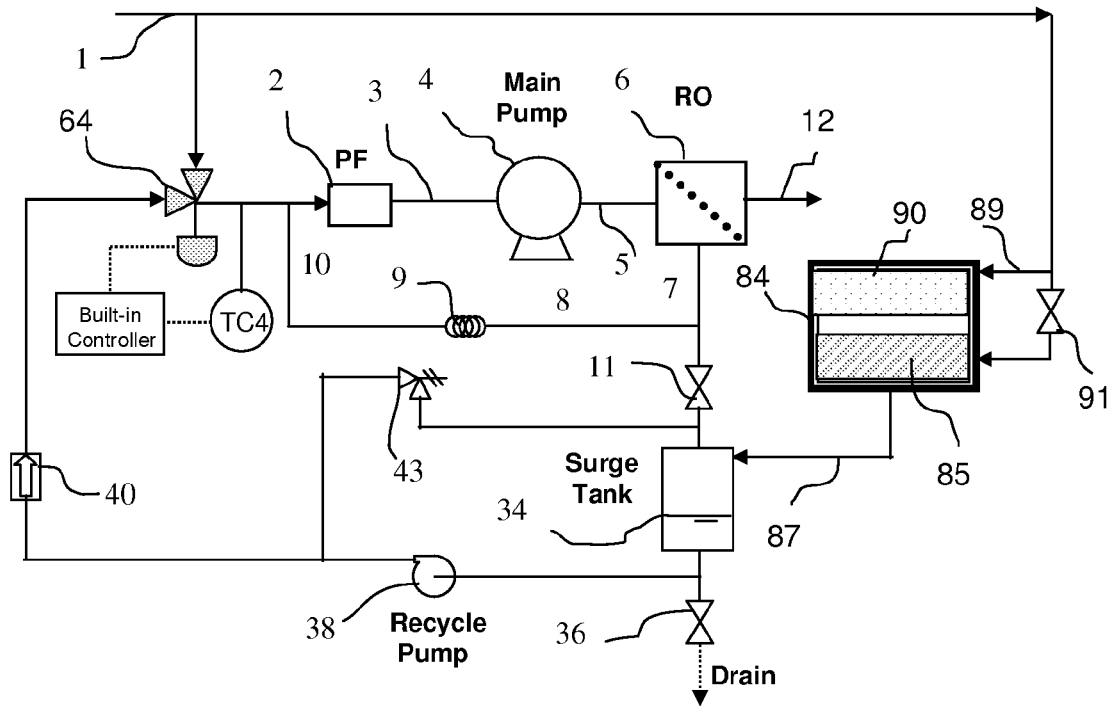
FIG. 7 is a flow diagram of a direct ice chill process for cooling feed water.

FIG. 7 shows another method of directly cooling feed water in the fluid staging compartment. In this embodiment a refrigeration device 90 is coupled with the surge tank 34, to feed cold water into the surge tank that will again be recycled and used in the water preconditioning module. As shown in FIG. 7, a portion of the hot feed water 1 is delivered to the bimetal mixing valve 64, having a built-in controller as shown, capable of regulating the amount of water received from the hot water feed, and from the cooled water from the fluid staging compartment thereby regulating the temperature of the water input into the water preconditioning module. The remainder of the hot feed water 1 is delivered to the insulated container 84, with a first portion 89 delivered to the refrigeration device 90 installed at the top of the container 84, and a second portion diverted to the bottom of the insulated container 84 and being cooled by the ice deposited therein, the proportion of water for each purpose being determined by valve 91. In one operating mode, ice pieces are generated intermittently and deposited into the water bath in container 84. In another operating mode, a larger portion of feed water 1 is diverted through line 89 such that the surface in the refrigeration device 90 is continuously rinsed by hot water. The water, after being chilled by the refrigeration process within the container 84, is then sent to the surge tank 34, and proceeds through the remainder of the fluid staging compartment and back to the water preconditioning module as hereinbefore discussed.

An embodiment of a suitable aseptic bag filling interface for use with the present invention, as depicted in FIGS. 1 and 9, generally comprises an air blower 49; a high-efficiency particulate air (HEPA) filter 51; and an aseptic filling nozzle assembly 53 that transfers SWFI into chemical pre-filled IV bags 54. The nozzle assembly can be any commercially off the shelf systems that have been validated by the manufacturers for medical use.

In general, the low-pressure and low-temperature lines used throughout the modules and systems of the present invention can be made of plastic tubings or TEFLON tubings. These lines include the ones before the main pump 4, the flow path of the recycling pump 38, and the SWFI line down stream of valve 27. All process lines, heat exchangers, and reactor that will encounter high-pressure and/or high-temperature water by design or accident should be made of stainless steel or other compatible metallic tubings.

Start-up Operation. Referring to FIG. 1, during the system start up, the electric heater 18 is first turned on. Then, a small stream of water is passed through the main pump 4 (without being powered on) by the line pressure of the feed water or the action of the recycle pump 38 (about 10 to 60 psig). The start-up operation also serves as the steam sterilization process for the bag filling nozzle interface, including valve 47 and other components for communicating SWFI to the chemical pre-filled IV bags.

During this start up operation because of the low line pressure condition, no water passes through valve 11 of the water preconditioning module to reach tank 34. Depending upon the inlet line pressure, a small amount of the water passes through the RO membrane 6 and DI bed 12, and through the shell side of the tube-in-tube heat exchanger 15. In the reactor 17, the water is vaporized to provide the steady source of steam for sterilization of the bag filling interface components. Valves 20, 25, and 29 are three-way valves that are electronically controlled to divert fluid flow based on pre-programmed processing sequence and using temperature, pressure and flow rate of water as feedbacks. The start up procedure is considered a conditional situation. As indicated by the dotted line, valve 20 allows the steam from the reactor 17 to flow toward valve 29. At the same time, valve 29 is set to allow the steam to flow toward the filling interface via valve 47. During the start up procedure, no IV bag is attached to the interface, and therefore the steam from the reactor 17 continuously bleeds through to achieve sterilization of the bag filling components. The sterilization process of the filling nozzle assembly is determined by steam temperature and exposure time. Upon the completion of sterilization, valve 29 is switched to divert the steam to the discharge to the surge tank 34 for normal operation of the systems.

Normal Operation. Referring to FIG. 1 once the startup operation is complete, and the reactor 17 reaches the desired operating temperature (usually greater than 200° C.) the main pump 4 is turned on to generate sufficient pressure to operate the RO unit to produce a filtrate and a retentate. The main pump 4 raises the pressure of the feed water 3 to about 200 to 1500 psig, depending upon the selected operating temperature of the reactor 17. Under this pressure, a portion of the retentate returns to the pump inlet via the fixed flow restrictor 9, while the rest bleeds through valve 10 to reach tank 34. The conductivity sensor in tank 34 provides feedback for the quality of the retentate, to determine whether the water is recycled through the recycle pump 38 or rejected/drained via valve 36.

Valve 20 directs the high-temperature SWFI water from the reactor 17 through the tube side of heat exchanger 15 toward the fixed flow restrictor 23. Heat exchanger 15 reduces the temperature of the SWFI by exchanging heat with the incoming water, and flow restrictor 23 reduces the water pressure. The SWFI from restrictor 23 is now under relatively low pressure (below about 50 psig) and low temperature (about 10-20° C. higher than that of the incoming water). Valve 25 directs SWFI towards the spring-loaded pressure relief valve 27 to reach the filling nozzle assembly. The function of valve 27 is to prevent overpressure of the filling nozzle that communicates with IV bags. If the line pressure of SWFI is over the preset valve, then valve 27 releases and diverts some of the flow to tank 34.

The air blower 49 draws ambient air and pushes it through a high-efficiency particulate air (HEPA) filter 51. The clean air then reaches the aseptic filling nozzle assembly 53, thereby providing a simple, effective, and localized "clean room" environment that is required to ensure an aseptic filling with the connection through a nozzle assembly.

Emergency Situations. During an emergency situation such as immediate shut down procedure, power failure, or water cut off, valve 25 is set to fail-open to allow the water or steam to flow into tank 34.

Special Operations. As shown in FIG. 5 in some embodiments, tank 34 is used for bottled water manual addition. Pump 38 serves as a prime pump to deliver the water in tank 34 to the inlet of pump 4. The water is draw through the tube 110, and returned water is pumped through the annular section 111. Check valve 40 prevents the water back flow in case the line pressure of water at the inlet of pump 4 is higher. Adjustable flow restrictor 115 is used to establish steady-state flow conditions. This recirculation loop can achieve most efficient utilization of the bottled water 112 as the feed water source with minimal amount of waste water rejected.

The invention claimed is:

1. A system to produce sterile water for injection (SWFI) for on-site and on-demand intravenous fluid reconstitution, from feed water, comprising:
    a) a water preconditioning module comprising a pre-filter, a primary pump, reverse osmosis membranes, de-ionization resin beds, and first and second flow restrictors, wherein the water preconditioning module is designed and configured so that (i) the reverse osmosis membrane partitions the filtered water into a filtrate and a retentate, and passes the filtrate along a flow-path to and through the de-ionization resin beds to form de-ionized filtrate, while removing the retentate from this flow-path; (ii) the first flow restrictor controls the amount of retentate which is drawn back to the pre-filter for recirculation through the water preconditioning module; and (iii) the second flow restrictor controls the amount of retentate which is expelled from the module;
    b) a hydrothermal processor module comprising a first heat exchanger, a reactor coupled with a heater, a flow restrictor and a plurality of valves, wherein the hydrothermal processor module is designed and configured so that (i) the coupled reactor and heater sterilize and depyrogenate the de-ionized filtrate; (ii) the first heat exchanger transfers heat from SWFI to the de-ionized filtrate; (iii) at least one of the valves diverts steam generated during the sterilization and depyrogenation of the de-ionized filtrate and away from the hydrothermal processor module; and (iv) at least one of the other valves diverts SWFI from the hydrothermal processor module; and
    c) a fluid staging compartment comprising a surge tank, a conductivity sensor in said surge tank, a recirculation pump, and a drain valve, wherein the fluid staging compartment is designed and configured so that (i) the surge tank receives retentate being expelled from the water preconditioning module, steam from the hydrothermal processor module, and diverted SWFI from the hydrothermal processor module; and (ii) the conductivity sensor measures the quality of the retentate, and based upon such measurement the drain valve allows continuous or intermittent draining of at least a portion of the accumulated water in the surge tank from the system; and (c) or the recirculation pump recirculates at least some of the water from the surge tank back to the water preconditioning module.

2. The system of claim 1, wherein the surge tank of the fluid staging compartment further comprises means to receive bottled water.

3. The system of claim 1, wherein the surge tank of the fluid staging compartment further comprises one or more sensors that can detect conditions of water within the surge tank, the sensors being selected to measure conditions of water within the tank, such conditions being selected from the group consisting of: temperature and pressure and conductivity.

4. The system of claim 1, further comprising means to cool the temperature of the feed water to within a pre-determined temperature range prior to drawing the water into the water preconditioning module, wherein the cooling means comprises a heat exchanger, a radiator and a fan, wherein the fan is designed and configured to force ambient air through said radiator.

5. The system of claim 4, further comprising a container designed and configured to house the heat exchanger, and a water jet vacuum pump,
    wherein the cooling means is designed and configured to transfer the feed water through the radiator, and then transfer a first portion of the feed water to the heat exchanger, and a second portion of the feed water to the container; and
    wherein the water jet is coupled with the container so that the water jet, when in operation, reduces the pressure within the container.

6. The system of claim 1, further comprising means to cool the temperature of the feed water to within a pre-determined temperature range prior to drawing the water into the water preconditioning module, wherein the cooling means comprises a refrigeration device having a heat transfer fluid, a heat exchanger and a container, and is designed and configured so that the refrigeration device cools the heat transfer fluid, the container houses the heat exchanger and receives the cooled heat transfer fluid, and the feed water is transmitted through and cooled by means of the heat exchanger.

7. The system of claim 1, further comprising means to cool the temperature of the feed water to within a pre-determined temperature range prior to drawing the water into the water preconditioning module, wherein the cooling means comprises a refrigeration device having cooling surfaces, wherein the module is designed and configured so that at least a portion of the feed water is in contact with said cooling surfaces.

8. The system of claim 1, further comprising means to cool the temperature of the feed water to within a pre-determined temperature range, wherein the cooling means comprises a refrigeration device, a heat transfer fluid and a jacketed vessel having an interior cavity between two surfaces, wherein the cooling means is designed and configured so that the vessel receives cooled heat transfer fluid from the refrigeration device, and the feed water is circulated through the vessel interior cavity.

9. The system of claim 1, further comprising means to heat the temperature of the feed water to within a pre-determined temperature range prior to drawing the water into the water preconditioning module, said means comprising a thermostatic mixing valve, a heater and a plurality of valves;
    wherein the heating means is designed and configured so that a first valve controls the amount of water transferred to the heater, a second valve controls the amount of water diverted around the heater, and the thermostatic mixing valve receives heated water and diverted water, and controls the amount of water from each so that water delivered from the thermostatic mixing valve is within a pre-determined temperature range.

10. The system of claim 1, further comprising means to heat the temperature of the feed water to within a pre-determined temperature range prior to drawing the water into the water preconditioning module, said means comprising a heat exchanger, wherein the heat exchanger is designed and configured to exchange heat from the deionized filtrate to the feed water.

11. The system of claim 1, wherein the hydrothermal processor module further comprises a second heat exchanger in series with the first heat exchanger, and a thermostatic mixing valve, and wherein the module is designed and configured to adjust the temperature of the SWFI by drawing a portion of the SWFI from the first heat exchanger, and a portion from the second heat exchanger, and delivering the SWFI from each heat exchanger to the thermostatic mixing valve.

12. The system of claim 11, wherein the hydrothermal processor module further comprises a radiator coupled with a fan, in series with the thermostatic mixing valve, wherein the radiator is designed and configured to cool the SWFI passing from one of the heat exchangers.

13. The system of claim 1, wherein the hydrothermal processor module further comprises a secondary pump in series with the first heat exchanger.

14. The system of claim 1, wherein the fluid staging compartment further comprises a refrigeration device adapted and configured to receive and cool at least a portion of the feed water, and deliver the cooled feed water to the surge tank.

15. A system to produce sterile water for injection (SWFI) for on-site and on-demand intravenous fluid reconstitution, from feed water, comprising:
  a) means to cool the temperature of the feed water to within a pre-determined temperature range, wherein the cooling means comprises a heat exchanger, a radiator and a fan, wherein the fan is designed and configured to force ambient air through said radiator;
  b) a water preconditioning module comprising a pre-filter, a primary pump, reverse osmosis membranes, de-ionization resin beds, and first and second flow restrictors,
    wherein the water preconditioning module is designed and configured so that (i) the reverse osmosis membrane partitions the filtered water into a filtrate and a retentate, and passes the filtrate along a flow-path to and through the de-ionization resin beds to form de-ionized filtrate, while removing the retentate from this flow-path; (ii) the first flow restrictor controls the amount of retentate which is drawn back to the prefilter for recirculation through the water preconditioning module; and (iii) the second flow restrictor controls the amount of retentate which is expelled from the module;
  c) a hydrothermal processor module comprising a first heat exchanger, a reactor coupled with a heater, a flow restrictor and a plurality of valves,
    wherein the hydrothermal processor module is designed and configured so that (i) the coupled reactor and heater sterilize and depyrogenate the de-ionized filtrate; (ii) the first heat exchanger transfers heat from SWFI to the de-ionized filtrate; (iii) at least one of the valves diverts SWFI from the hydrothermal processor module; and
  d) a fluid staging compartment comprising a surge tank, a conductivity sensor in said surge tank, a recirculation pump, and a drain valve,
    wherein the fluid staging compartment is designed and configured so that (i) the surge tank receives retentate being expelled from the water preconditioning module and diverted SWFI from the hydrothermal processor module; and (ii) the conductivity sensor measures the quality of the retentate, and based upon such measurement the drain valve allows continuous or intermittent draining of at least a portion of the accumulated water in the surge tank from the system; and (c) or the recirculation pump recirculates at least some of the water from the surge tank back to the water preconditioning module.

16. The system of claim 15, wherein the cooling means further comprises a container designed and configured to house the heat exchanger, and a water jet vacuum pump,
  wherein the cooling means is designed and configured to transfer the feed water through the radiator, and then transfer a first portion of the feed water to the heat exchanger, and a second portion of the feed water to the container; and
  wherein the water jet is coupled with the container so that the water jet, when in operation, reduces the pressure within the container.

17. The system of claim 15, wherein the hydrothermal processor module further comprises a second heat exchanger in series with the first heat exchanger, a thermostatic mixing valve, and a radiator and a fan,
  wherein the module is designed and configured to adjust the temperature of the SWFI by drawing a portion of the SWFI from the first heat exchanger, and the remainder of the SWFI from the second heat exchanger, passing the portion of SWFI from the second heat exchanger through the radiator, and delivering the SWFI from the first heat exchanger and the radiator to the thermostatic mixing valve.

18. A system to produce sterile water for injection (SWFI) for on-site and on-demand intravenous fluid reconstitution, from feed water, comprising:
  a) means to cool the temperature of the feed water to within a pre-determined temperature range, wherein the cooling means comprises a refrigeration device and a container;
  b) a water preconditioning module comprising a pre-filter, a primary pump, reverse osmosis membranes, de-ionization resin beds, and first and second flow restrictors,
    wherein the water preconditioning module is designed and configured so that (i) the reverse osmosis membrane partitions the filtered water into a filtrate and a retentate, and passes the filtrate along a flow-path to and through the de-ionization resin beds to form de-ionized filtrate, while removing the retentate from this flow-path; (ii) the first flow restrictor controls the amount of retentate which is drawn back to the pre-filter for recirculation through the water preconditioning module; and (iii) the second flow restrictor controls the amount of retentate which is expelled from the module;
  c) a hydrothermal processor module comprising a first heat exchanger, a reactor coupled with a heater, a flow restrictor and a plurality of valves,
    wherein the hydrothermal processor module is designed and configured so that (i) the coupled reactor and heater sterilize and depyrogenate the de-ionized filtrate; (ii) the first heat exchanger transfers heat from SWFI to the de-ionized filtrate; (iii) at least one of the valves diverts SWFI from the hydrothermal processor module; and
  d) a fluid staging compartment comprising a surge tank, a conductivity sensor in said surge tank, a recirculation pump, and a drain valve, the surge tank comprises means to directly receive water from a standard personal water container, wherein the fluid staging compartment is designed and configured so that (i) the surge tank receives retentate being expelled from the water preconditioning module and diverted SWFI from the hydrothermal processor module; and (ii) the conductivity sensor measures the quality of the retentate, and based upon such measurement the drain valve allows continuous or intermittent draining of at least a portion of the accumulated water in the surge tank from the system; and (iii) or the recirculation pump recirculates at least some of the water from the surge tank back to the water preconditioning module.

19. The system of claim 18, wherein the cooling means further comprises two heat exchangers, a heat transfer fluid, a refrigerant, and a recirculation pump, wherein the first heat exchanger uses the refrigerant, and the second heat exchanger uses the heat transfer fluid, and further wherein the feed water is fed through the second heat exchanger, and transfers heat from the feed water to the heat transfer fluid; the recirculation pump circulates the heat transfer fluid to the first heat exchanger; and the first heat exchanger transfers heat from the heat transfer fluid to the refrigerant.

20. The system of claim 19, wherein the heat transfer fluid is selected from the group consisting of: water, aqueous salt solutions, organic compounds or solutions, and ionic liquids.

21. The system of claim 18, wherein the container is a jacketed vessel having an interior cavity between two surfaces, wherein the cooling means is designed and configured so that the feed water is circulated through the jacketed vessel interior cavity.

22. The system of claim 18, wherein the refrigeration device includes surfaces in contact with a heat transfer fluid, and wherein the system is designed and configured so that the feed water is cooled by direct contact with the surfaces.

* * * * *

UNITED STATES PATENT AND TRADEMARK OFFICE
CERTIFICATE OF CORRECTION

| | | |
|---|---|---|
| PATENT NO. | : 8,518,252 B1 | Page 1 of 1 |
| APPLICATION NO. | : 12/119480 | |
| DATED | : August 27, 2013 | |
| INVENTOR(S) | : Li | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1203 days.

Signed and Sealed this

Thirty-first Day of March, 2015

Michelle K. Lee
*Director of the United States Patent and Trademark Office*